US011465685B2

(12) United States Patent
Kamimura et al.

(10) Patent No.: US 11,465,685 B2
(45) Date of Patent: Oct. 11, 2022

(54) VEHICLE BODY

(71) Applicants: TOYOTA JIDOSHA KABUSHIKI KAISHA, Toyota (JP); SUBARU CORPORATION, Tokyo (JP)

(72) Inventors: Shinya Kamimura, Toyota (JP); Sachiko Yoshida, Nisshin (JP); Tomoaki Mizusaki, Nagoya (JP); Tadashi Itoh, Toyota (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/369,148

(22) Filed: Jul. 7, 2021

(65) Prior Publication Data

US 2022/0073139 A1 Mar. 10, 2022

(30) Foreign Application Priority Data

Sep. 4, 2020 (JP) ............................. JP2020-149269

(51) Int. Cl.
*B62D 21/11* (2006.01)
(52) U.S. Cl.
CPC .................................. *B62D 21/11* (2013.01)
(58) Field of Classification Search
CPC ........ B62D 21/11; B62D 25/04; B62D 25/16; B62D 27/02; B62D 25/02
See application file for complete search history.

(56) References Cited

U.S. PATENT DOCUMENTS

| 2016/0221610 A1* | 8/2016 | Nishimura | ............. B62D 25/04 |
| 2018/0273110 A1* | 9/2018 | Masuda | ............... B62D 25/088 |
| 2018/0312201 A1* | 11/2018 | Tanabe | .................... B62D 25/16 |
| 2020/0269928 A1* | 8/2020 | Ishimoto | ............. B62D 25/087 |
| 2020/0331538 A1* | 10/2020 | Nishimura | ........... B62D 25/087 |
| 2021/0229752 A1* | 7/2021 | Goto | .................... B62D 25/088 |
| 2021/0229753 A1* | 7/2021 | Goto | .................... B62D 27/023 |

FOREIGN PATENT DOCUMENTS

| JP | 2001063622 A | * | 3/2001 |
| JP | 2016-088143 A | | 5/2016 |
| JP | 2018-075894 A | | 5/2018 |
| JP | 2019-196104 A | | 11/2019 |

* cited by examiner

*Primary Examiner* — Darlene P Condra
(74) *Attorney, Agent, or Firm* — Oliff PLC

(57) ABSTRACT

A vehicle body may include a rear opening; a rear header extending in a width direction of the vehicle body along an upper edge of the rear opening; a rear pillar extending from an end of the rear header along a side edge of the rear opening; a rear wheelhouse located below the rear pillar; and a rear suspension tower disposed at the rear wheelhouse, wherein a rear suspension is mounted on the rear suspension tower. The rear pillar may include a first portion extending rearward from the end of the rear header; and a second portion bending at a rear end of the first portion and extending downward therefrom. The vehicle body may further include a first frame connecting the rear suspension tower to the rear header; and a second frame connecting a halfway point of the first portion of the rear pillar to the rear wheelhouse.

3 Claims, 6 Drawing Sheets

VEHICLE BODY

CROSS-REFERENCE TO RELATED APPLICATION

This application claims priority to Japanese Patent Application No. 2020-149269 filed on Sep. 4, 2020, the contents of which are hereby incorporated by reference into the present application.

TECHNICAL FIELD

The technique disclosed herein relates to a vehicle body.

BACKGROUND

It is required for vehicle bodies to ensure body rigidity and absorb vibrations from suspensions. Japanese Patent Application Publication No. 2019-196104 describes a vehicle body in which a rear wheelhouse is reinforced. Further. Japanese Patent Application Publication Nos. 2018-75894 and 2016-88143 describe relevant techniques.

SUMMARY

Reinforcing the vicinity of a wheelhouse may be insufficient to ensure body rigidity. The disclosure herein provides a vehicle body with a structure that enables increased body rigidity.

A vehicle body disclosed herein may comprise a rear opening; a rear header extending in a width direction of the vehicle body along an upper edge of the rear opening; a rear pillar extending from an end of the rear header along a side edge of the rear opening; a rear wheelhouse located below the rear pillar; and a rear suspension tower disposed at the rear wheelhouse, wherein a rear suspension is mounted on the rear suspension tower. The rear pillar may comprise a first portion extending rearward from the end of the rear header; and a second portion bending at a rear end of the first portion and extending downward therefrom. The vehicle body may further comprise a first frame connecting the rear suspension tower and the rear header to each other; and a second frame connecting a halfway point of the first portion of the rear pillar and the rear wheelhouse to each other.

In the vehicle body disclosed herein, the first frame can connect the rear suspension tower and the rear header to each other. Further, the second frame can support the halfway point of the first portion of the rear pillar extending rearward. This configures a robust frame structure, thereby increasing rigidity of the vehicle body. Since input from the rear suspension can be effectively received, vibrations can be reduced.

Details and further improvements of the technique disclosed herein will be described in Detailed Description below.

DETAILED DESCRIPTION

The first portion of the rear pillar may meet the second frame approximately at a right angle at a connection of the first portion and the second frame. This reduces a bending moment generated in the second frame supporting the first portion of the rear pillar. It is possible to provide a robust frame structure.

The rear pillar may further comprise an inner sheet material and an outer sheet material that define a first enclosed space along a longitudinal direction of the rear pillar. The inner sheet material and the outer sheet material may be welded to each other at both ends of the first enclosed space in a width direction of the first enclosed space. The second frame may be welded to the inner sheet material at a halfway point of the first enclosed space in the width direction of the first enclosed space. Compared to a case where the second frame is welded to an end of the first enclosed space in the width direction of the first enclosed space, the second frame being welded at the halfway point of the first enclosed space in the width direction of the first enclosed space reduces a rotational moment applied to the rear pillar. It is possible to provide a robust frame structure.

The vehicle body may further comprise a rear side panel extending between the rear pillar and the rear wheelhouse. The second frame may comprise a sheet material that is welded to the rear side panel to define a second enclosed space. At a connection of the rear pillar and the second frame, the second enclosed space defined in the second frame may oppose the first enclosed space defined in the rear pillar with the inner sheet material interposed therebetween. The second enclosed space can support the first enclosed space. This distributes a load more evenly since a supporting area is larger compared to a case where the first enclosed space is supported by point support. It is possible to provide a robust frame structure.

The vehicle body may further comprise a rear side door opening; and a window glass opening located rearward of a rear edge of the rear side door opening and forward of the first frame. This positional relationship allows the first frame to be arranged to connect the rear suspension tower and the rear header to each other.

(Structure of Vehicle Body 1)

Figure 1:
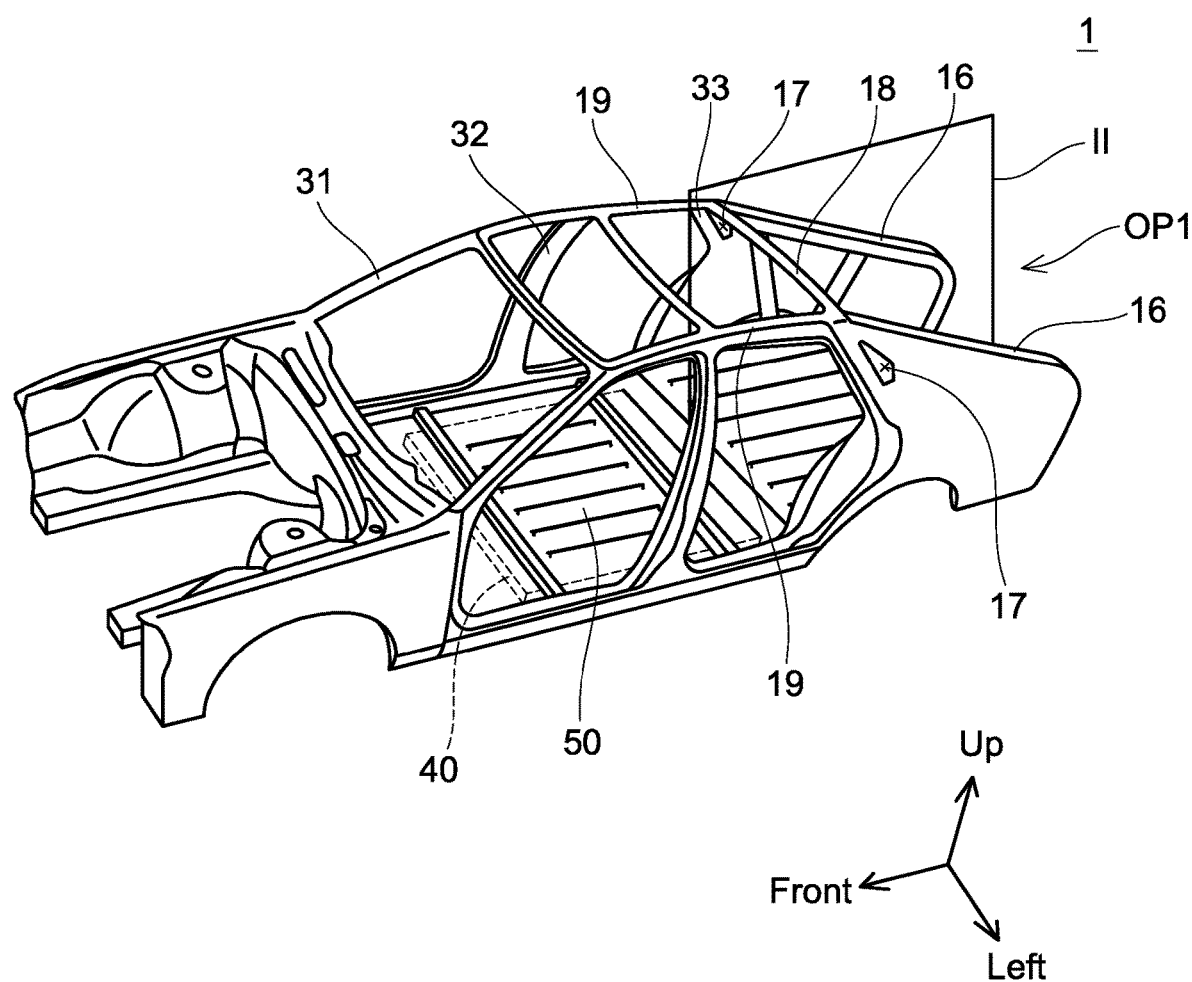
FIG. 1 is a perspective view of a vehicle body 1.

FIG. 1 is a perspective view of a vehicle body 1. Regarding the coordinate system in FIG. 1, "Front" indicates a front direction of the vehicle, "Up" indicates an upward direction of the vehicle, and "Left" indicates "left" in a rear view of the vehicle. The same applies to the coordinate systems in the other drawings.

A battery unit 40 is disposed below a floor panel 50. The battery unit 40 is connected to a motor (not shown) via a power control unit (not shown) and supplies electric power to the motor.

Figure 2:
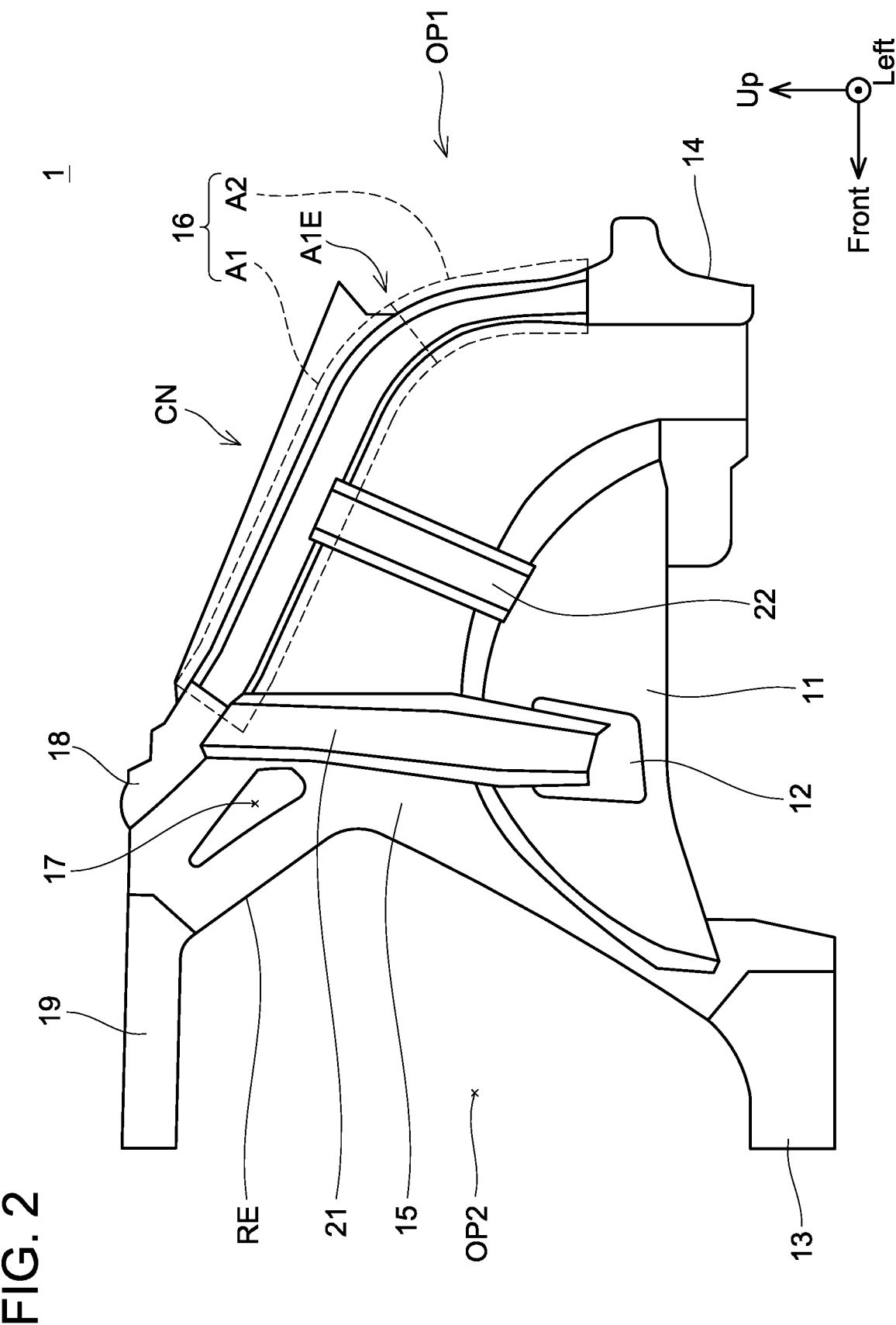
FIG. 2 is a cross sectional view of the vehicle body along a plane II in FIG. 1.

FIG. 2 shows a cross-sectional view of the vehicle body 1 along a plane II in FIG. 1. FIG. 2 shows a structure of a right rear portion of the vehicle body 1. The vehicle body 1 according to the present embodiment is bilaterally symmetric, and thus the following description will be made only for the right portion of the vehicle body 1. As shown in FIG. 2, the vehicle body 1 includes an inner rear wheelhouse 11, a rear suspension tower 12, a side sill 13, a rear end panel 14, a rear side panel 15, a rear pillar 16, a window glass opening 17, a rear header 18, a roof side rail 19, a first frame 21, a second frame 22, and a back door opening OP1.

The back door opening OP1 is an opening surrounded by the rear header 18, right and left rear pillars 16, and the rear end panel 14. The back door opening OP1 is configured to be opened/closed by a back door (not shown).

The rear header 18 extends in a width direction of the vehicle along an upper edge of the back door opening OP1. The rear header 18 is a member that connects the roof side rail 19 along the vehicle width direction.

The rear pillar 16 extends along a side edge of the back door opening OP1 from an end of the rear header 18 in the vehicle width direction. The rear pillar 16 is also called a D pillar. This is because, as shown in FIG. 1, four pillars, namely an A pillar 31, a B pillar 32, a C pillar 33, and a D pillar (rear pillar 16) are arranged in this order from the front to rear of the vehicle. These pillars support a roof of the vehicle and ensure the strength of the entire vehicle body 1.

As shown in FIG. 2, the rear pillar 16 includes a first portion A1 and a second portion A2. The first portion A1 extends rearward from the end of the rear header 18. The second portion A2 bends at a rear end A1E of the first portion A1 and extends downward therefrom.

A lower end of the second portion A2 of the rear pillar 16 is connected to the rear end panel 14. The rear end panel 14 connects the right and left rear pillars 16 to each other in the vehicle width direction.

The inner rear wheelhouse 11 is disposed below the rear pillar 16. The inner rear wheelhouse 11 covers a rear wheel of the vehicle and has a substantially dome shape protruding inward relative to the rear side panel 15 in the vehicle width direction. The rear suspension tower 12 is disposed at the inner rear wheelhouse 11. A rear suspension is mounted on the rear suspension tower 12. The rear suspension tower 12 supports an upper end of a rear suspension dumper (not shown). Specifically, the upper end of the rear suspension dumper is inserted and fixed in a through hole of the rear suspension tower 12.

The rear side panel 15 extends between the rear pillar 16 and the inner rear wheelhouse 11. The rear side panel 15 is a panel member configuring a side face of the vehicle body 1.

The rear side panel 15 is also called a roof side inner panel. A lower portion of the rear side panel 15 and the inner rear wheelhouse 11 configure a rear wheelhouse covering a rear wheel (not shown). The side sill 13 is disposed below a rear side door opening OP2. A front end of the rear side panel 15 is connected to a rear end of the side sill 13.

The window glass opening 17 is a substantially triangle opening provided in the rear side panel 15. A rear quarter glass (not shown) is set in the window glass opening 17. The window glass opening 17 is located rearward of a rear edge RE of the rear side door opening OP2 and forward of the first frame 21. This positional relationship allows the first frame 21 to be disposed to connect the rear suspension tower 12 and the rear header 18 to each other.

Each of the first frame 21 and the second frame 22 is formed by welding a sheet material (e.g., a steel plate) having a cross sectional shape of a hat brimmed over the entire circumference (which will be abbreviated as "brimmed hat-shaped cross section") to the rear side panel 15. Each of the first frame 21 and the second frame 22 has an inwardly protruding closed cross section defined by the rear side panel 15 and the sheet material. The first frame 21 and the second frame 22 are also called reinforcements.

The first frame 21 connects the rear suspension tower 12 and the rear header 18 to each other. The first frame 21 may be connected to the rear suspension tower 12 and the rear header 18 via various connections. Examples of such connections at the rear suspension tower 12 include a reinforcement formed at the inner rear wheelhouse 11 by weld beads, a steel plate welded to the inner rear wheelhouse 11 for reinforcement, and the like. Examples of such connections at the rear header 18 include a corner member connecting the end of the rear header 18 to the rear pillar 16 and the like.

The second frame 22 connects a connection CN of the first portion A1 of the rear pillar 16 and the inner rear wheelhouse 11 to each other. The connection CN is at a halfway point of the first portion A1 in a front-rear direction of the vehicle. In the present embodiment, the connection CN is approximately at a midpoint between the rear header 18 and the rear end A1E of the first portion A1. At the connection CN, the first portion A1 meets the second frame 22 approximately at the right angle. The second frame 22 may be connected to the rear pillar 16 and the inner rear wheelhouse 11 via various connections.

(Connection Structure of Second Frame 22 and Rear Pillar 16)

Figure 3:
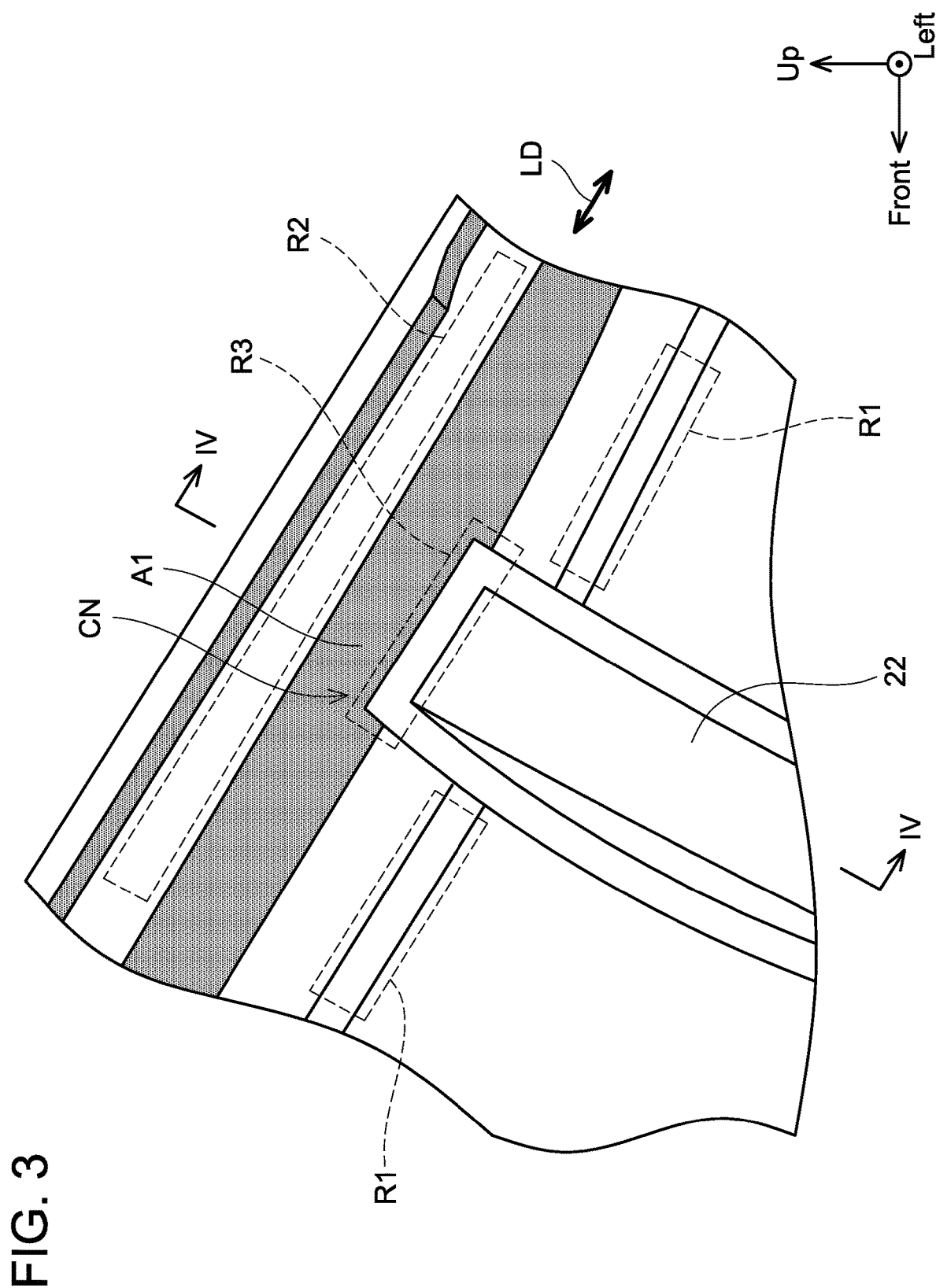
FIG. 3 is a partial enlarged view of a connection CN.
Figure 4:
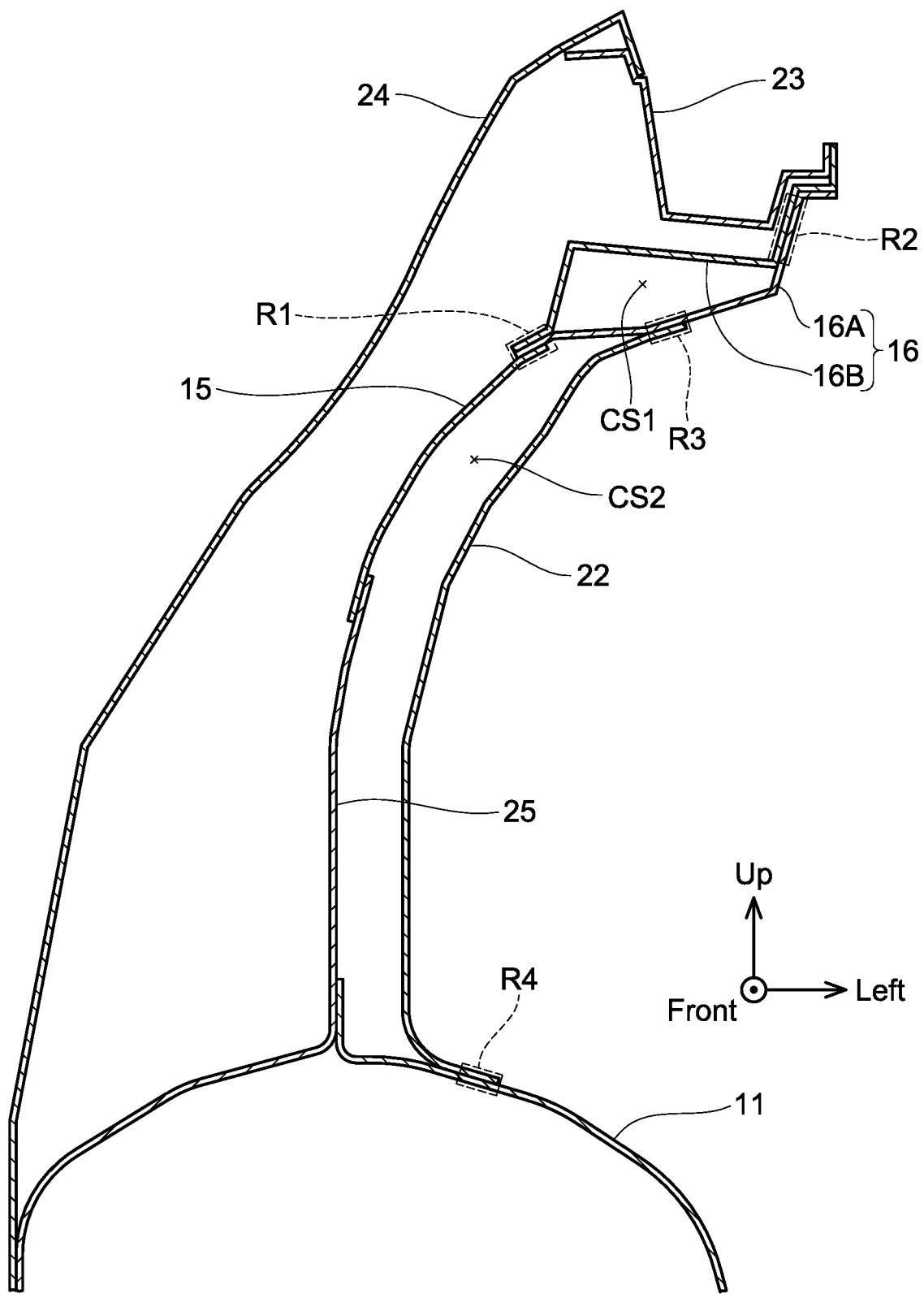
FIG. 4 is a cross-sectional view along a line IV-IV in FIG. 3.

FIG. 3 is an enlarged view of the connection CN between the first portion A1 of the rear pillar 16 and the second frame 22. For a three-dimensional appearance, portions to be shadowed when lighted from upper side are shown in gray in FIG. 3. FIG. 4 is a cross-sectional view along a line IV-IV in FIG. 3. As shown in FIG. 4, the right side portion of the vehicle body 1 includes the rear side panel 15, the second frame 22, an inner sheet material 16A, an outer sheet material 16B, a trough 23, an outer side member 24, the inner rear wheelhouse 11, and an outer rear wheelhouse 25.

The inner sheet material 16A and the outer sheet material 16B are members configuring the rear pillar 16. In the present embodiment, each of the inner sheet material 16A and the outer sheet material 16B is a steel plate having the brimmed hat-shaped cross section. The inner sheet material 16A and the outer sheet material 16B are welded to each other at a region R1 and a region R2 which are located on both sides of a first enclosed space CS1 in a width direction of the first enclosed space CS1. Specifically, flanges of the inner sheet material 16A and the outer sheet material 16B protrude on both sides of the first enclosed space CS1 in the width direction thereof, and the flanges are welded to each other. As above, the rear pillar 16 with the first enclosed space CS1 is provided along a longitudinal direction LD shown in FIG. 3.

The second frame 22 is formed by welding a sheet material (e.g., a steel plate) having the brimmed hat-shaped cross section to the rear side panel 15. Specifically, flanges at both ends of the second frame 22 in its width direction are welded to an inner surface of the rear side panel 15. The second frame 22 and the rear side panel 15 define a second enclosed space CS2.

As shown in FIG. 4, an upper end of the second frame 22 is welded to the inner sheet material 16A at a region R3. The region R3 corresponds to a halfway point of the first enclosed space CS1 in the width direction of the first enclosed space CS1. Specifically, the region R3 is positioned between the region R1 and the region R2. The region R3 may not necessarily be a midpoint between the region R1 and the region R2. At the connection CN, the second enclosed space CS2 formed in the second frame 22 opposes to the first enclosed space CS1 formed in the rear pillar 16 with the inner sheet material 16A of the rear pillar 16 interposed therebetween. Specifically, the first enclosed space CS1 is positioned above the inner sheet material 16A and the second enclosed space CS2 is positioned below the inner sheet material 16A.

A lower end of the second frame 22 is welded to the inner rear wheelhouse 11 at a region R4. The trough 23 is positioned above the outer sheet material 16B. The trough 23 is a groove provided around surrounding edges of the back door opening OP1 and functions as a gutter. The outer side member 24 is positioned outward of the rear side panel 15 and the outer sheet material 16B. The outer side member 24 configures an outer wall of the vehicle body and is also called an outer side panel. The outer rear wheelhouse 25 is positioned below the rear side panel 15. The outer rear wheelhouse 25 covers a rear wheel of the vehicle and has a substantially dome shape protruding outward relative to the rear side panel 15 in the vehicle width direction.

(Effects)

In the vehicle body 1 disclosed herein, the first frame 21 can connect the rear suspension tower 12 and the rear header 18 to each other. Further, the second flume 22 can support the halfway point of the first portion A1 of the rear pillar 16. Thereby, a robust frame structure can be provided, and thus it is possible to increase rigidity of the vehicle body 1. Since input from the rear suspension can be effectively received, vibrations can be reduced.

Figure 5:
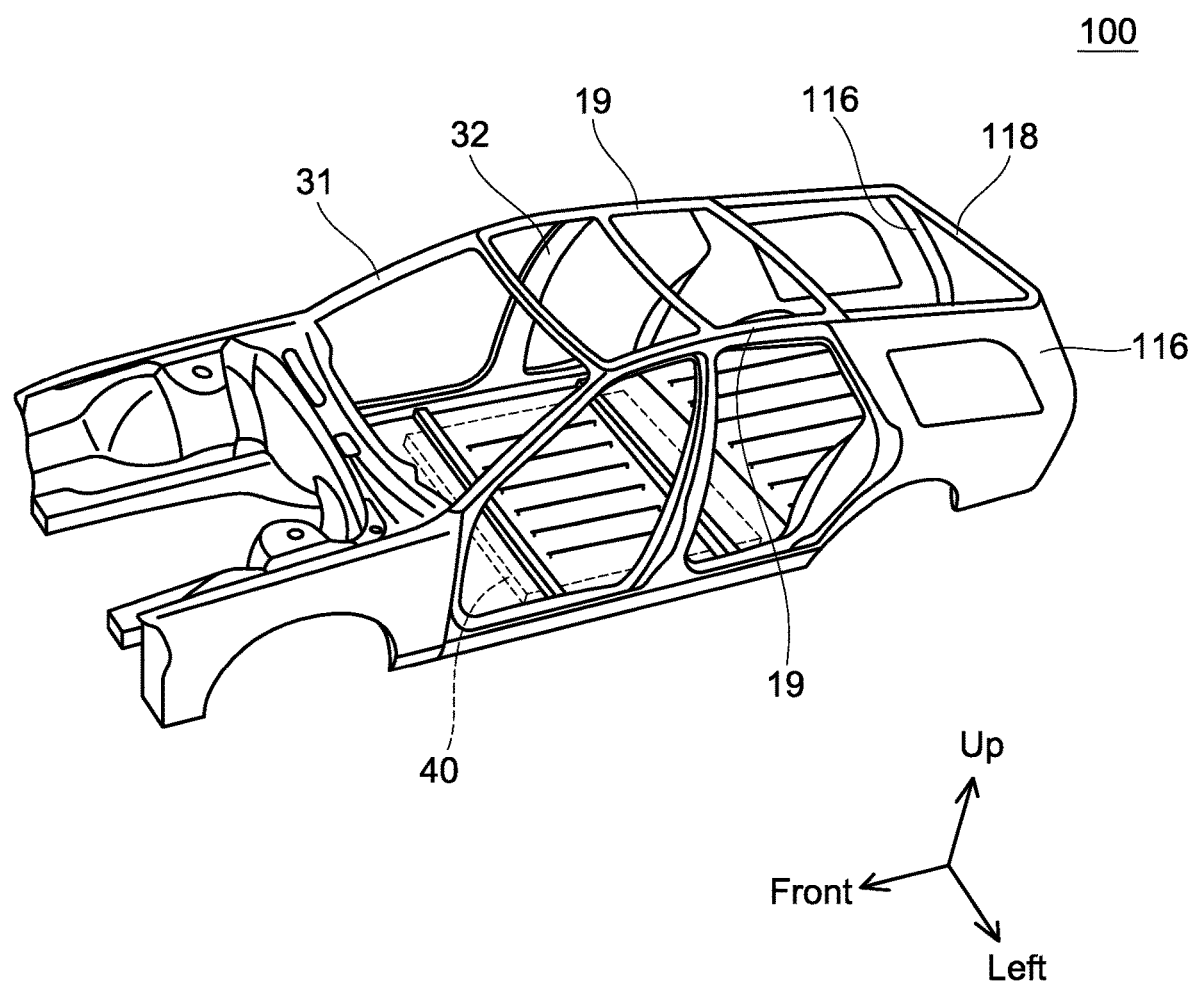
FIG. 5 is a perspective view of a vehicle body 100 according to a comparative example.

FIG. 5 is a perspective view of a vehicle body 100 according to a comparative example. The vehicle body 100 is a typical body of a vehicle type called SUV (sport utility vehicle). In the vehicle body 100, a rear header 118 is positioned in the vicinity of a rear end of the vehicle. Thus, an angle of a rear pillar 116 relative to a floor plane is large (i.e., the rear pillar 116 is standing). To the contrary, in the vehicle body 1 disclosed herein (see FIG. 1), the rear header 18 is positioned closer to the front of the vehicle compared to the rear header 118 of the vehicle body 100. Thus, an angle of the rear pillar 16 relative to the floor plane is small (i.e., the rear pillar 16 is lying down). In this design, the length of the rear pillar 16 is longer than that of the rear pillar 116 according to the comparative example, and thus the rigidity of the body could be thereby decreased. However, the vehicle body 1 includes the first frame 21 and the second frame 22 as described, and therefore the body rigidity is not decreased even with the design of the rear pillar 16 lying down.

At the connection CN, the first portion A1 of the rear pillar 16 meets the second frame 22 approximately at the right angle. This reduces a bending moment generated in the second frame 22 supporting the first portion A1. It is possible to provide a robust frame structure since a pillar generally exhibits higher resistance to compression stress than to bending stress.

Figure 6:
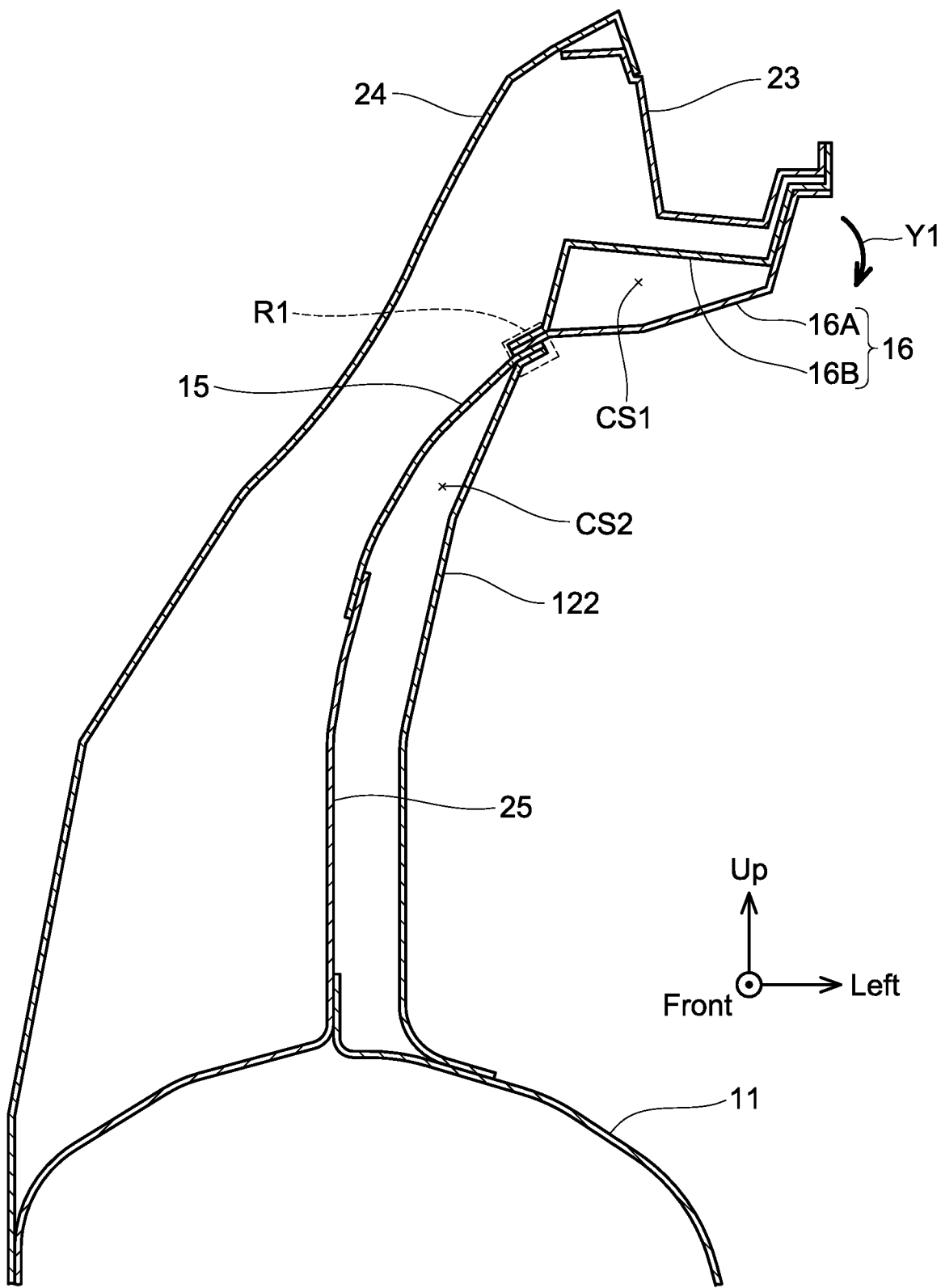
FIG. 6 is a cross-sectional view of a comparative example.

FIG. 6 shows a comparative example. The cross section shown in FIG. 6 corresponds to the cross section shown in FIG. 4. In the comparative example shown in FIG. 6. an upper end of a second frame 122 is welded at a region R1 which is an end of the rear pillar 16 in its width direction. That is, the upper end of the second frame 122 is welded to the flanges protruding from the rear pillar 16. In this structure, a rotational moment is generated in a direction of arrow Y1 with the region R1 as the point of support. To the contrary, in the vehicle body 1 disclosed herein (see FIG. 4), the upper end of the second frame 22 is welded at the region R3 which is the halfway point of the rear pillar 16 in its width direction. Thus, it is possible to support the vicinity of rotation center compared to the structure of the comparative example. Since the distance between the rotation center and the line of action can be shortened, the rotational moment can be reduced. Therefore, it is possible to provide a robust frame structure.

In the comparative example of FIG. 6, the rear pillar 16 having the first enclosed space CS1 is supported by the flanges at the region R1. This is point support. To the contrary, in the vehicle body 1 disclosed herein (see FIG. 4), the rear pillar 16 having the first enclosed space CS1 is supported by the second enclosed space CS2. This is face support. Since the supporting area is larger compared with the point support of the comparative example, a load applied to the second frame 22 can be distributed. Thus, it is possible to provide a robust frame structure.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

(Variants)

The first portion A1 of the rear pillar 16 is not limited to having a linear shape, and may have a gently curved shape. Any portion that extends from the rear header 18 to the bend at the rear end A1E and has a smaller radius of curvature than the bend can be considered as the first portion A1.

The connection CN may be at any position as long as the position is somewhere between the rear header 18 and the rear end A1E of the first portion A1.

The suspension style of being supported by the rear suspension tower 12 may be any of strut-type suspension, torsion beam suspension, multilink suspension, and the like.

The back door opening OP1 is an example of the rear opening.

What is claimed is:

1. A vehicle body comprising:
   a rear opening;
   a rear header extending in a width direction of the vehicle body along an upper edge of the rear opening;
   a rear pillar extending from an end of the rear header along a side edge of the rear opening;
   a rear wheelhouse located below the rear pillar;
   a rear suspension tower disposed at the rear wheelhouse, wherein a rear suspension is mounted on the rear suspension tower; and
   a rear side panel extending between the rear pillar and the rear wheelhouse, wherein
   the rear pillar comprises:
     a first portion extending rearward from the end of the rear header;
     a second portion bending at a rear end of the first portion and extending downward therefrom; and
     an inner sheet material and an outer sheet material that define a first enclosed space along a longitudinal direction of the rear pillar,
   the inner sheet material and the outer sheet material are welded to each other at both ends of the first enclosed space in a width direction of the first enclosed space,
   the vehicle body further comprises:
     a first frame connecting the rear suspension tower and the rear header to each other; and a second frame connecting a halfway point of the first portion of the rear pillar and the rear wheelhouse to each other, the second frame is welded to the inner sheet material at a halfway point of the first enclosed space in the width direction of the first enclosed space, the second frame comprises a sheet material that is welded to the rear side panel to define a second enclosed space, and at a connection of the rear pillar and the second frame, the second enclosed space defined in the second frame opposes the first enclosed space defined in the rear pillar with the inner sheet material interposed therebetween.

2. The vehicle body according to claim 1, wherein the first portion of the rear pillar meets the second frame approximately at a right angle at a connection of the first portion and the second frame.

3. The vehicle body according to claim 1, further comprising:

a rear side door opening; and a window glass opening located rearward of a rear edge of the rear side door opening and forward of the first frame.

* * * * *